US009705270B2

(12) United States Patent
Fuchs et al.

(10) Patent No.: US 9,705,270 B2
(45) Date of Patent: Jul. 11, 2017

(54) UNIVERSAL SOCKET SOLUTION

(71) Applicant: Lenovo Enterprise Solutions (Singapore) Pte. Ltd., Singapore (SG)

(72) Inventors: Brian Fuchs, Morrisville, NC (US); Russell S. Padgett, Cary, NC (US); Daniel Ranck, Morrisville, NC (US); Suresh K. Thapa, Morrisville, NC (US)

(73) Assignee: Lenovo Enterprise Solutions (Singagapore) Pte. Ltd., Singapore (SG)

( * ) Notice: Subject to any disclaimer, the term of this patent is extended or adjusted under 35 U.S.C. 154(b) by 77 days.

(21) Appl. No.: 14/663,802

(22) Filed: Mar. 20, 2015

(65) Prior Publication Data

US 2016/0276946 A1 Sep. 22, 2016

(51) Int. Cl.

| | |
|---|---|
| ***H01R 25/00*** | (2006.01) |
| ***H01R 13/66*** | (2006.01) |
| ***G06F 1/26*** | (2006.01) |
| ***H01R 29/00*** | (2006.01) |
| *H01R 13/24* | (2006.01) |
| *H01R 24/76* | (2011.01) |

(52) U.S. Cl.

CPC ......... *H01R 29/00* (2013.01); *H01R 13/6683* (2013.01); *H01R 13/2421* (2013.01); *H01R 24/76* (2013.01); *H01R 25/00* (2013.01)

(58) Field of Classification Search

CPC H01R 25/006; H01R 31/065; H01R 13/6675; H01R 13/66; H01R 25/00; G06F 1/26; H02J 3/00; H02M 7/003

See application file for complete search history.

(56) References Cited

U.S. PATENT DOCUMENTS 6,552,888 B2 * 4/2003 Weinberger .......... H01R 13/713 307/125
8,115,335 B2 * 2/2012 Menas ...................... G06F 1/26 307/11

* cited by examiner

*Primary Examiner* — Gary L Laxton
(74) *Attorney, Agent, or Firm* — Lieberman & Brandsdorfer, LLC

(57) ABSTRACT

A universal power outlet, a universal junction box associated with a cover, and a universal extension cord. Sensors within openings in electrical sockets detect different characteristics of plug contacts. In response to the detected characteristics, power requirements for an energy consuming device associated with the plug are correlated. Logic dynamically selects and delivers a level of required power, from multiple available levels of power, to the device based on the detected characteristics.

17 Claims, 8 Drawing Sheets

UNIVERSAL SOCKET SOLUTION

BACKGROUND

The present disclosure relates to powering electrical devices using a universal power socket. More specifically, the embodiments of the disclosure relate to assessing a voltage level for each of a variety of power consuming devices, and delivering power to a power consuming device in communication with the socket at the assessed level.

As technology advances, the number of power consuming devices in the marketplace expands. Examples of power consuming devices include, but are not limited to, light bulbs, mobile telecommunication devices, computers, radios, portable electronic devices, etc. Each device varies in function, and may be designed and configured to operate with different electrical requirements. For example, input voltage requirements may range from 120v AC and 6v DC to 24v DC. These devices operate under electrical power received from a power source, such as a battery or an outlet. To communicate with the outlet, devices utilize a power cord with a distal end having a plug configured to be received by the outlet. Although the plug configuration may be uniform in a jurisdiction, the uniformity may not reflect the power required for the associated device, and, as such, the device may receive more power than is required.

SUMMARY

The disclosed embodiments pertain to apparatus for assessing a voltage level for power consuming devices and delivering voltage at the assessed level.

In one aspect, a power outlet is provided with a socket having an opening to receive a plug to deliver electrical energy to an associated electronic device. The plug has at least one contact with a physical profile correlating with a voltage requirement for the device. The socket is in communication with at least one sensor. The sensor detects the contact's physical profile. The sensor is in communication with logic, which converts the detected contact profile to the voltage requirement for the device and delivers power to the device at a level correlated with the requirement.

In another aspect, an apparatus is provided with a receptacle containing a junction of electrical wires. The receptacle is configured to receive a cover, so that an electrical socket is formed. The cover includes a first metal conductor and a second metal conductor. The first metal conductor is positioned to engage with a corresponding first contact of the receptacle. Similarly, the second metal conductor is positioned to engage with a corresponding second contact of the receptacle. Engaging the receptacle contacts with the cover conductors activates logic that dynamically selects a voltage level and delivers corresponding power at the selected level to a power receiving device.

In yet another aspect, an apparatus is provided with an extension cord for an electrical outlet. The cord is configured with a series of at least two secondary outlets in communication with embedded logic. The cord has a first end with a plug configured to be received by the electrical outlet. The series of outlets include a first outlet and a second outlet, each configured with a sensor in communication with the logic. At such time as one of the secondary outlets receives a plug from an associated electrical device, the sensor receives the plug contact and detects the associated physical profile. The logic converts the detected contact profile to a voltage requirement for the device and delivers power to the device at a level correlated with the requirement.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments, unless otherwise explicitly indicated.

DETAILED DESCRIPTION

Figure 1:
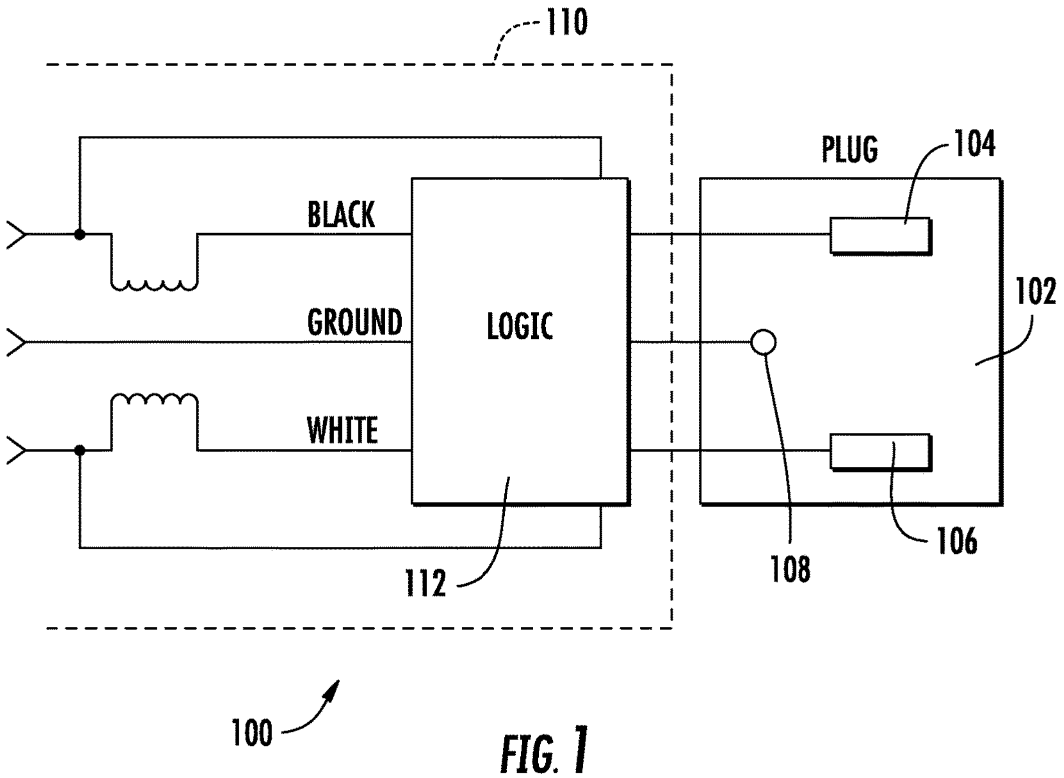
FIG. 1 depicts a block diagram of a universal power socket.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

It is understood that appliances, large and small, portable and stationary, consume energy. Such devices receive energy from one or more batteries, or through connection to a power outlet. At the same time, different devices may require different energy delivery requirements. For example, a mobile telephone may require a different energy level than an appliance, such as a refrigerator. For the most part, there are two main types of electric systems used around the world, with varying physical connections, including 100-127 volts at 60 hertz (Hz) and 220-240 volts at 50 Hz. If the voltage and frequency of a device is the same, then the only change may be the physical plug interface via an adapter.

Otherwise, if the voltage provided by the supply is not within the range accepted by the device, then a transformer or converter will be required to convert the voltage. At the same time, an adapter in the form of a device may be required to insert the associated plug into an outlet socket so that the physical configuration of one or more plug contacts, also referred to herein as prongs, may be received by the outlet. With this in mind, users supply their own wall adapters that convert incompatible voltage to a required voltage for a device being powered. To do so, users must have a wall adapter for each device requiring power or a supply cord that delivers the required power to the device in the form needed. Depending upon device requirements, a user may require multiple wall adapters.

For devices operating in any of these ranges, e.g. 100-127 volts at 60 hertz (Hz) and 220-240 volts at 50 Hz they may not require the full amount of energy being delivered to supply power to the power consuming device.

In addition, in the event of a loss of the adapter, the power consuming device may not communicate with the outlet and receive energy until a new power source or an adapter can be found. To resolve issues associated with outlets and adapters, as well as delivering excess energy, a universal wall outlet that senses power required by the type of plug used is provided. The outlet continues to support current industry power plug and current requirements. In addition, the universal wall outlet could be transportable depending upon requirements of the user. As used herein, an electrical device, power receiving device, or power consuming object all refer to a device requiring power to operate. These terms and others complimentary terms, as understood in the art, are freely interchangeable.

Referring now to FIG. 1, a block diagram of a universal power socket (100) is provided. The electrical socket is configured to receive a plug (not shown) from an electrical device to deliver electrical energy from the socket to the electrical device. Salient features of the socket (100) include, a face plate (102) configured to receive the plug from the electrical device. The plug is generally configured with two contacts, including a first contact and a second contact, and, in one embodiment, with three contacts, including a first contact, a second contact, and a third contact. Similarly, in one embodiment, the plug may be configured with a single contact to interface with the socket. The face plate (102) has at least two openings, including a first opening (104) and a second opening (106), and in one embodiment, a third opening (108) configured to receive a ground contact of a grounded plug. Each of the contacts or arrangement of contacts has a physical profile relating to a voltage requirement for an associated electrical device.

Each opening, (104), (106), and (108), of the face plate (102) communicates with a corresponding sensor (110). When the contact(s) engages any of the openings (104), (106), and/or (108) of the face plate (102), the sensor (110) detects the physical profile(s). More specifically, the physical profile(s) of the contact(s) correlates with the voltage requirements for the device associated with the plug. In one embodiment, the contact profile is selected from a group of seven profiles, and the sensor (110) detects a multiple of seven configurations for any given plug. Further, in one embodiment, the number of configurations increases if the plug further comprises an additional contact, such as the ground contact (108). The number of profiles is for exemplary purposes, and is not meant to be limiting. Accordingly, the sensor functions to detect the presence and characteristics of one or more plug contacts received in the associated openings of the socket.

As further shown, logic (112) is provided to interface with the sensor (110) and to transform a detected physical profile into voltage requirements for an associated electrical device. The logic (112) is in communication with the sensor (110). The sensor (110) is primarily responsible for detecting the contact profile, and the logic (112) functions to translate the detected profile to a voltage requirement for an associated power consuming device. The logic (112) generates the voltage requirement associated with the received plug (not shown), and delivers power to the electrical device in communication with the received plug at a level that correlates with the requirements associated with the contacts' physical profile. In one embodiment, the logic (112) is configured for a plurality of voltage levels, and each level corresponds to a different voltage requirement, which is assigned to a defined contact profile. Accordingly, the sensor (110) detects the contact profile, and the logic (112) generates the voltage requirements for the detected profile.

Figure 2:
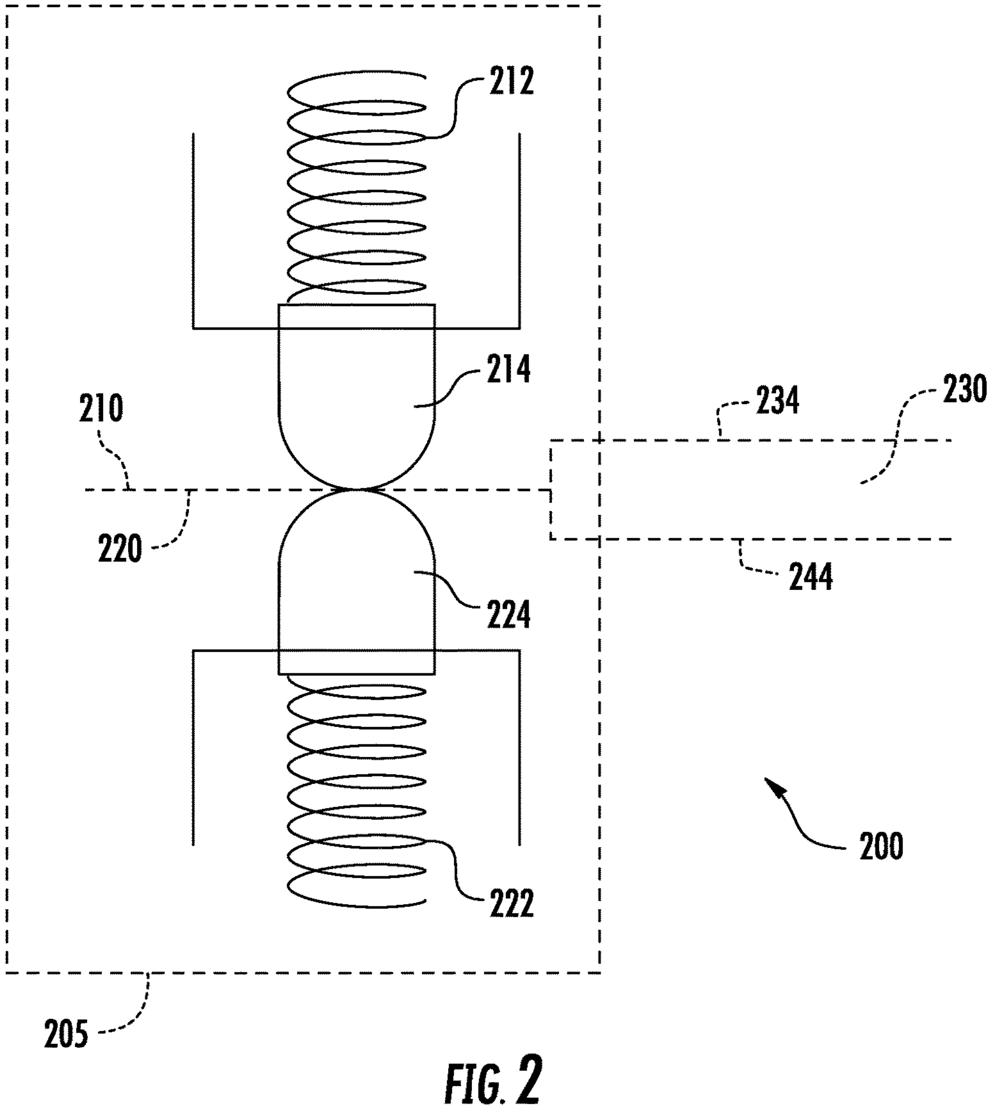
FIG. 2 depicts a sectional view of a sensor in a rest position.

As introduced in FIG. 1, the socket is configured with one or more openings and a sensor to detect the profile of a received contact. Referring now to FIG. 2, a sectional view of a sensor (200) in a rest position is provided. The sensor (200) is internal to one or more of the opening(s) (104), (106), and (108) shown and described in FIG. 1. In one embodiment, each opening in the socket may be configured with the sensor(s) shown and described in detail below. The sensor (200) is shown comprised of a minimum of one set having two related components. The set includes a pair of posts and associated resilient members. More specifically, a first pair (210) includes a first resilient member (212) and a first post (214), and a second pair (220) includes a second resilient member (222) and a second post (224). The first pair (210) and the second pair (220) form a first set (205). The first pair (210) and the second pair (220) are oppositely disposed, so that the first post (214) and the second post (224) are adjacently positioned. The first resilient member (212) is fixed to the first post (214), and the second resilient member (222) is fixed to the second post (224). In one embodiment, the resilient members, (212) and (222), are each comprised of a spring. A property of the resilient members enables the associated post to change positions.

The resilient members, (212) and (214), extend from a stationary position, e.g. non-compressed, to a compressed position. In one embodiment, each resilient member may have a plurality of positions depending on a level of compression. Although not a component of the sensor (200), a contact (230) for an electrical plug is shown with phantom lines to be received in the socket opening and engage the pairs (210) and (220). When engaged with the contact (230), the posts, (214) and (224), detect the physical characteristics of the contact (230). In one embodiment, the first post (214) and the second post (224) are in physical contact when the associated resilient members are in a non-compressed state, as shown. When the contact (230) is received in the socket, the resilient members (212) and (222) compress, and the contact (230) is positioned between the posts (214) and (224), so that the engagement of the posts (214) and (224) is transferred to oppositely disposed walls (234) and (244) of the contact (230). Accordingly, when the contact (230) is received by the posts (214) and (224), the first wall (234) comes into contact with the first post (214) and the second wall (244) comes into contact with the second post (224), and the corresponding resilient members (212) and (222) compress.

Figure 3:
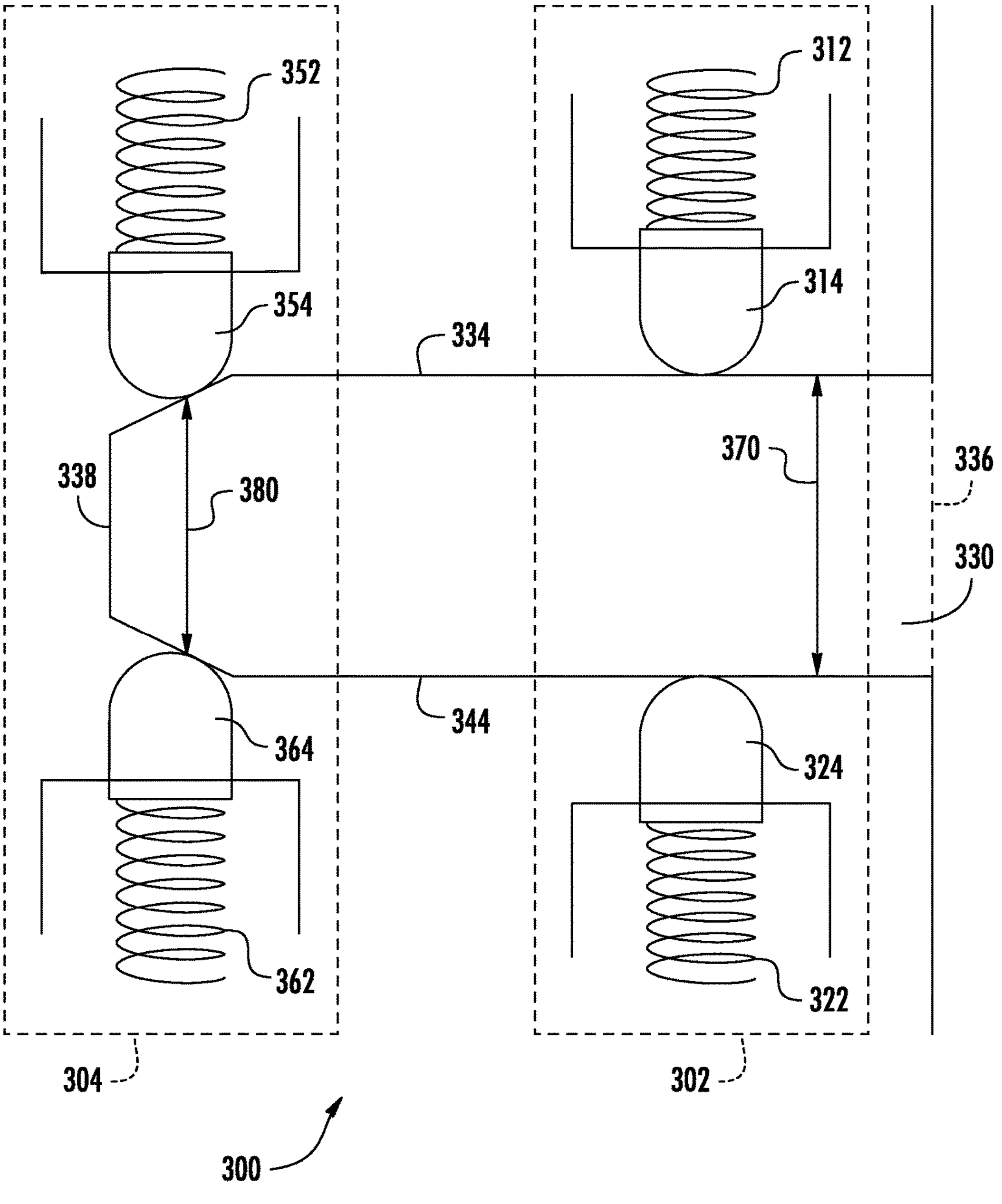
FIG. 3 depicts a sectional view of a sensor in an active position.

Referring to FIG. 3, a sectional view of a sensor (300) in an active position is provided. For descriptive purposes, two sets of sensor posts are shown herein, although this quantity should not be considered limiting. A contact (330) is shown received by the socket and sensor posts are shown in a compressed state. The two sets of sensor posts include a first set (302) with posts (314) and (324) and a second set (304) with posts (354) and (364). Posts (314) and (354) are in communication with a first wall (334) of the received contact (330), and posts (324) and (364) are in communication with a second wall (344) of the received contact (330). At the same time, receipt of the contact (330) causes the resilient members to compress. As shown, each post has an associated resilient member. Specifically, post (314) is in communication with resilient member (312), post (324) is in communication with resilient member (322), post (354) is in communication with resilient member (352), and post (364) is in communication with resilient member (362). When subject to compression, oppositely positioned posts do not remain in contact. Rather, each post is in contact with a respective side wall of the plug contact (330). At such time as the plug contact (330) is removed from the socket opening, the resilient members return to a non-compressed state, as shown and described in FIG. 2. Different size plug contacts will cause different levels of compression of the resilient members. Accordingly, the level or quantity of compression dictates the size of the plug contact received in the socket.

FIG. 2 shows one set of posts and associated resilient members in a non-compressed state, and FIG. 3 shows two sets of posts and associated resilient members in a compressed state. As further shown in FIG. 3, the plug contact (330) may have a non-uniform shape. More specifically, the plug contact (330) has a first width (370) proximate to a first end (336) and a second width (380) proximate to a second end (338) of the plug contact. Employing the two sets of posts (302) and (304), a difference between the first width (370) and the second width (380) may be sensed and communicated to the associated logic (112). At such time as the plug contact (330) is removed from the socket opening, the resilient members return to the non-compressed state, as shown and described in FIG. 2. Accordingly, an increase in the number of sets of posts and resilient members increases the sensitivity of the sensing device to the physical profile of the received plug contact (330).

The socket sensors shown and described in FIGS. 2 and 3 illustrate a single set of posts and resilient members and multiple sets, respectively, that are adjacently positioned. The quantity of sets of posts and resilient members shown and described should not be considered limiting. An increase in the quantity of sets provides an increase in sensitivity for detecting the profile of the received plug contact. The sensor pairs function to detect the shape and size of the plug contact, which directly correlates to the voltage required to power an associated electrical device. The level of compression is communicated to the logic (112). Accordingly, the sensors function to detect the size and/or profile of the received plug contact so that the logic may deliver an appropriate level of electrical energy.

The sensor(s) shown and described in FIGS. 1, 2, and 3 are mechanical sensors. The sensor(s) may come in different configurations. Such configurations including, but are not limited to other forms of mechanical sensor(s), optical sensor(s), etc. Accordingly, the sensor(s) shown and described in FIGS. 1, 2, and 3 should not be considered limiting.

As described in detail below, different plug profile shapes are configured to correlate with different voltage levels required to power an associated electrical device. The contact profiles shown and described below are correlated with a socket having two sets of sensors, for a total of four posts to communication with the plug contact and four associated resilient members to communication with the logic.

Figure 4A:
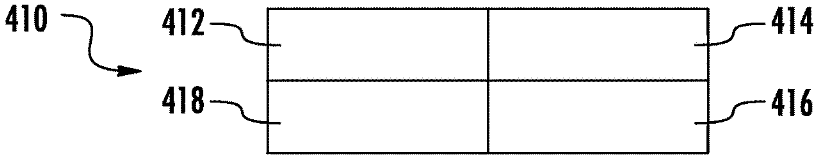
FIGS. 4A-4G depict side perspective views of seven different plug contact shapes.

Referring now to FIGS. 4A-4G, side perspective views of seven different plug contact shapes (400) are presented. A standard rectangular shaped plug contact is shown divided into four sections. In a socket configured with two sets of sensors, at least one set will receive and be in communication with the contact. As shown in FIG. 4A, a plug contact (410) is shown with four sections, including a first section (412), a second section (414), a third section (416), and a four section (418). When the plug contact (410) is received in the outlet socket (not shown), each section (412)-(418) of the plug contact will engage and activate a separate sensor. Each engaged sensor, in this scenario comprising all of the sensors, will communicate with the logic to deliver electrical energy to the plug contact at the level that correlates with the detected shape. Accordingly, the plug contact shape shown herein will engage each of the sensors in a socket configured with two sets of sensors.

Figure 4B:

Referring to FIG. 4B, a plug contact (420) is shown with three sections and one omitted section. The shown sections include a first section (422), a third section (426), and a fourth section (428). A second section (424) is shown with phantom lines to reference an absent or otherwise removed section. When the plug contact (420) is received in the outlet socket (not shown), each section (422), (426), and (428) of the plug will engage and activate a separate sensor. However, the omitted second section (424) will not engage an adjacently positioned sensor in the socket. This plug contact (420) will only remain engaged with three sensors when fully received in the socket. Each engaged sensor adjacent to sections (422), (426), and (428) of the plug will communicate with the logic to deliver electrical energy to the plug contact at the level that correlates with the detected shape.

Figure 4C:
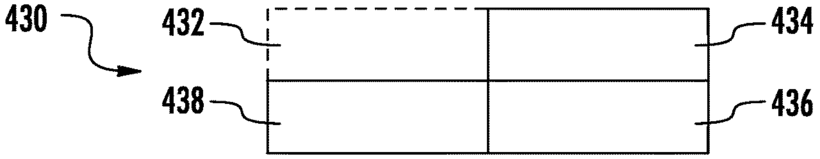

Referring to FIG. 4C, a plug contact (430) is shown with three sections and one omitted section. The shown sections include a second section (434), a third section (436), and a fourth section (438). A first section (432) is shown with phantom lines to reference an absent or otherwise removed section. When the plug contact (430) is received in the outlet socket (not shown), each section (434), (436), and (438) of the plug will engage and activate a separate sensor. However, the omitted section (432) will not engage an adjacently positioned sensor in the socket. This plug contact (430) will only remain engaged with three sensors when fully received in the socket. Each engaged sensor adjacent to sections (434), (436), and (438) of the plug will communicate with the logic to deliver electrical energy to the plug contact at the level that correlates with the detected shape.

Figure 4D:
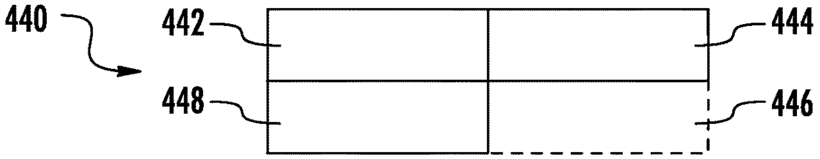

Referring to FIG. 4D, a plug contact (440) is shown with three sections and one omitted section. The shown sections include a first section (442), a second section (444), and a fourth section (448). A third section (446) is shown with phantom lines to reference an absent or otherwise removed section. When the plug contact (440) is received in the outlet socket (not shown), each section (442), (444), and (448) of the plug will engage and activate a separate sensor. However, the omitted section (446) will not engage an adjacently positioned sensor in the socket. This plug contact (440) will only remain engaged with three sensors when fully received in the socket. Each engaged sensor adjacent to sections (442), (444), and (448) of the plug will communicate with the logic to deliver electrical energy to the plug contact at the level that correlates with the detected shape.

Figure 4E:
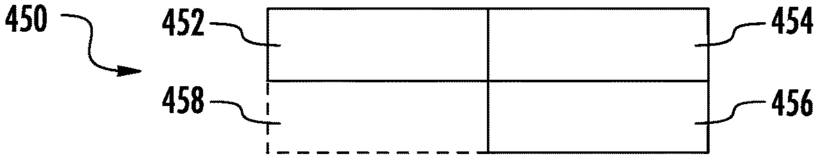

Referring to FIG. 4E, a plug contact (450) is shown with three sections and one omitted section. The shown sections include a first section (452), a second section (454), and a third section (456). A fourth section (458) is shown with phantom lines to reference an absent or otherwise removed section. When the plug contact (450) is received in the outlet socket (not shown), each section (452), (454), and (456) of the plug will engage and activate a separate sensor. However, the omitted section (458) will not engage an adjacently positioned sensor in the socket. This plug contact (450) will only remain engaged with three sensors when fully received in the socket. Each engaged sensor adjacent to sections (452), (454), and (456) of the plug will communicate with the logic to deliver electrical energy to the plug contact at the level that correlates with the detected shape.

Figure 4F:
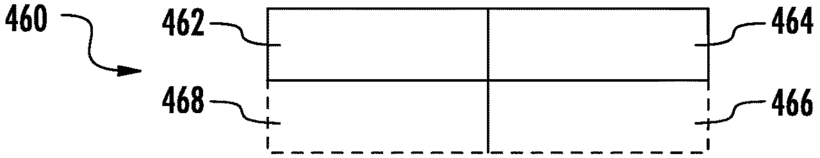

Referring to FIG. 4F, a plug contact (460) is shown with two sections and two omitted sections. The shown sections include a first section (462) and a second section (464). A third section (466) and a fourth section (468) are shown with phantom lines to reference an absent or otherwise removed section. When the plug contact (460) is received in the outlet socket (not shown), each section (462) and (464) of the plug will engage and activate a separate sensor. However, the omitted sections (466) and (468) will not engage an adjacently positioned sensor in the socket. This plug contact (460) will only remain engaged with two sensors when fully received in the socket. Each engaged sensor adjacent to sections (462) and (464) of the plug will communicate with the logic to deliver electrical energy to the plug contact at the level that correlates with the detected shape.

Figure 4G:
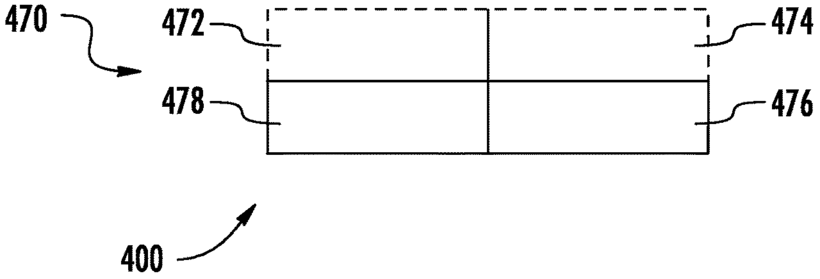

Referring to FIG. 4G, a plug contact (470) is shown as the inverse of the contact in FIG. 4F. Two plug sections are shown and two sections are omitted. The shown sections include a third section (476) and a fourth (478). First and second sections (472) and (474), respectively, are shown with phantom lines to reference an absent or otherwise removed section. When the plug contact (470) is received in the outlet socket (not shown), each section (476) and (478) of the plug will engage and activate a separate sensor. However, the omitted sections (472) and (474) will not engage an adjacently positioned sensor in the socket. This plug contact (470) will only remain engaged with two sensors when fully received in the socket. Each engaged sensor adjacent to sections (476) and (478) of the plug will communicate with the logic to deliver electrical energy to the plug contact at the level that correlates with the detected shape.

A plug contact's physical profile reflects a voltage requirement for an electrical device associated with the plug. Different detected contact profiles yield differences in delivered power to electrical devices associated with the different contact profiles. Sensors detect plug contact shape and logic in communication with the sensors deliver voltage based on the detected shape. The sensors shown and described in FIGS. 2 and 3 pertain to mechanical sensors in communication with the logic. In one embodiment, the sensors may take on different forms, including an electrical sensor, material detection, etc. Accordingly, sensors may come in various forms that have at least two separate and distinct states, with each state corresponding to a different logical value, and should not be limited to the form or quantity shown and described herein.

Figure 5:
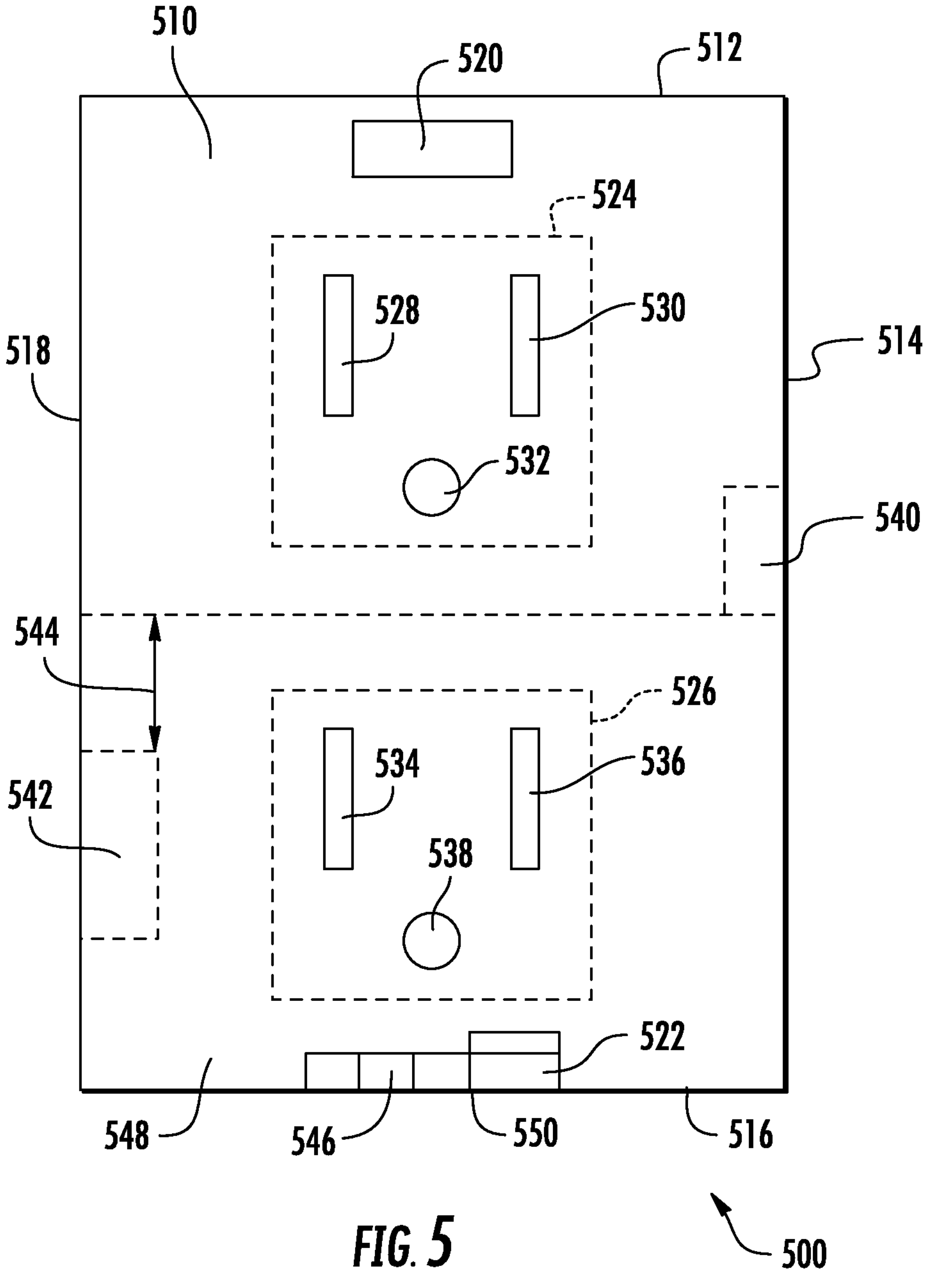
FIG. 5 depicts a front view of a portable face plate supporting dynamic detection of a plug contact and associated delivery of electrical energy.

The embodiments shown and described in FIGS. 1-4 relate to a wall outlet having a socket to receive a contact of an electrical plug, and more specifically, an arrangement of sensors within the outlet with the sensors in communication with logic to transform the voltage level required for delivery to a power consuming device. More specifically, the configuration of sensors and logic in FIGS. 1-4 is relatively static. Referring now to FIG. 5, a front view (500) of a portable face plate supporting dynamic detection of a plug contact and associated delivery of electrical energy is presented. The face plate (510) is sized and configured to be received by an electrical junction box, also referred to herein as a receptacle, and as such is configured with a size and shape that corresponds to that of the junction box. In one embodiment, the configuration of the size and shape of the face plate (510) may be modified based on changes in the size and configuration of the junction box. The face plate (510) functions as a portable socket that supports the dynamic functionality shown and described in FIGS. 1-4.

As shown, the face plate (510) has four sides, including a first side (512), a second side (514), a third side (516), and a fourth side (518). The first side (512) is oppositely disposed from the third side (516), and in one embodiment sides (512) and (516) are arranged parallel or relatively parallel. The second side (514) is oppositely disposed from the fourth side (518), and in one embodiment, the sides (514) and (518) are arranged parallel or relatively parallel. Both first and third sides, (512) and (516), respectively, are adjacent to the second side (514) and the fourth side (518). In an exemplary embodiment, the four sides, (512), (514), (516), and (518), form a rectangular structure, as understood in conventional junction boxes. With respect to material, the face plate (510) may be constructed from a plastic material or a metallic material if the material is insulated.

The face plate (510) further comprises two secure and release mechanisms, hereinafter referred to as release mechanisms, including a first release mechanism (520) and a second release mechanism (522). The first release mechanism (520) is proximate to the first side (512) and distal to the third side (516). The second release mechanism (522) is proximate to the third side (516) and distal to the first side (512). The first and second release mechanisms, (520) and (522), have a corresponding securing mechanism on an opposite surface (not shown) of the face plate (510). In one embodiment, the corresponding securing mechanism mechanically attaches to a receiver in an electrical junction box, as shown and described below in FIG. 7. When attaching the face plate (510) to the junction box, the securing mechanism(s) that correspond to the release mechanisms (520) and (522), are received by the junction box and mechanically attach and secure the face plate (510) to the junction box. Conversely, when detaching the face plate (510) from the junction box, the securing mechanism(s) are actuated to move the release mechanisms (520) and (522), thereby enabling the face plate (510) to be physically separated and removed from the junction box without any obstructions. The release mechanisms (520) and (522) are shown and described as a mechanical interface between the face plate (510) and the junction box. In one embodiment, the release mechanism (520) and (522) may take on different shapes and forms. For example, the mechanism may be replaced with a screw to more permanently secure the face plate (510) to an associated junction box, and in another embodiment may include magnets for attracting the face plate (510) to the junction box. Regardless of the form, the attachment mechanism mechanically holds the face plate (510) in a position with respect to the junction box. Accordingly, the first and second release mechanisms, (520) and (522), support portability of the faceplate with respect to the socket to form an electrical outlet.

The face plate (510) shown herein is configured with two sets of openings (524) and (526). When the face plate (510) is received by and secured to the junction box, an active socket is formed so that receipt of an electrical plug contact in one of the sets of openings (524) and (526) will deliver electrical energy to a power consuming device. Both a grounded plug and an ungrounded plug are supported. Specifically, the face plate (510) is shown with two sets of openings forming two sockets, including a first socket with the first set of openings (524) and a second socket with the second set of openings (526). The socket configuration of the cover is for exemplary purposes and is not meant to be limiting. The first socket (524) is shown herein as a grounded socket and includes three openings, specifically, a first opening (528), a second opening (530), and a third opening (532). The second socket (526) is also shown herein as a grounded socket and includes three openings, specifically a first opening (534), a second opening (536), and a third opening (538). In one embodiment, one or both of the sockets (524) and (526) may be configured without a ground opening. Accordingly, the face plate (510) is configured with socket openings to receive plugs associated with electrical consuming devices.

The face plate (510) is shown with a power slide, and more specifically, a first power slide (540) and a second power slide (542). Both of the first and second power slides, (540) and (542), comprise conducting material. In one embodiment, the first and second power slides, (540) and (542), comprise metallic conductors. The first and second power slides, (540) and (542), are not visible from the front surface (548) of the face plate (510), and as such are shown with phantom lines. The first and second power slides, (540) and (542), are shown positioned on different walls of the face plate (510). As shown herein, the first power slide (540) is in communication with the second side (514) and distal to the fourth side (518), and the second power slide (542) is in communication with the fourth side (518) and distal to the second side (514).

The first and second power slides, (540) and (542), are each shown laterally offset so they are not similarly positioned on oppositely disposed walls of the face plate (410), and further to facilitate a proper placement of the face plate (410) with respect to the junction box. As shown in this example, the first power slide (540) is laterally or longitudinally, depending on the perspective, offset from the second power slide (542) by a value (544). The offset prevents improper attachment of the cover (510) to a wall. For example, the position of the power slides with respect to the junction box ensures that the attachment of the face plate aligns the openings with wiring in the junction box to form the sockets (524) and (526). If face plate (510) is configured for a grounded socket, the face plate (510) further comprises a ground power slide (546), which is shown herein in communication with the third side (516) and oppositely disposed from the first side (512). The ground slide (546) is offset from the center point (550) of the third side (516). Accordingly, the slides (540), (542), and (546) are each positioned on different walls of the face plate (510).

Figure 6:
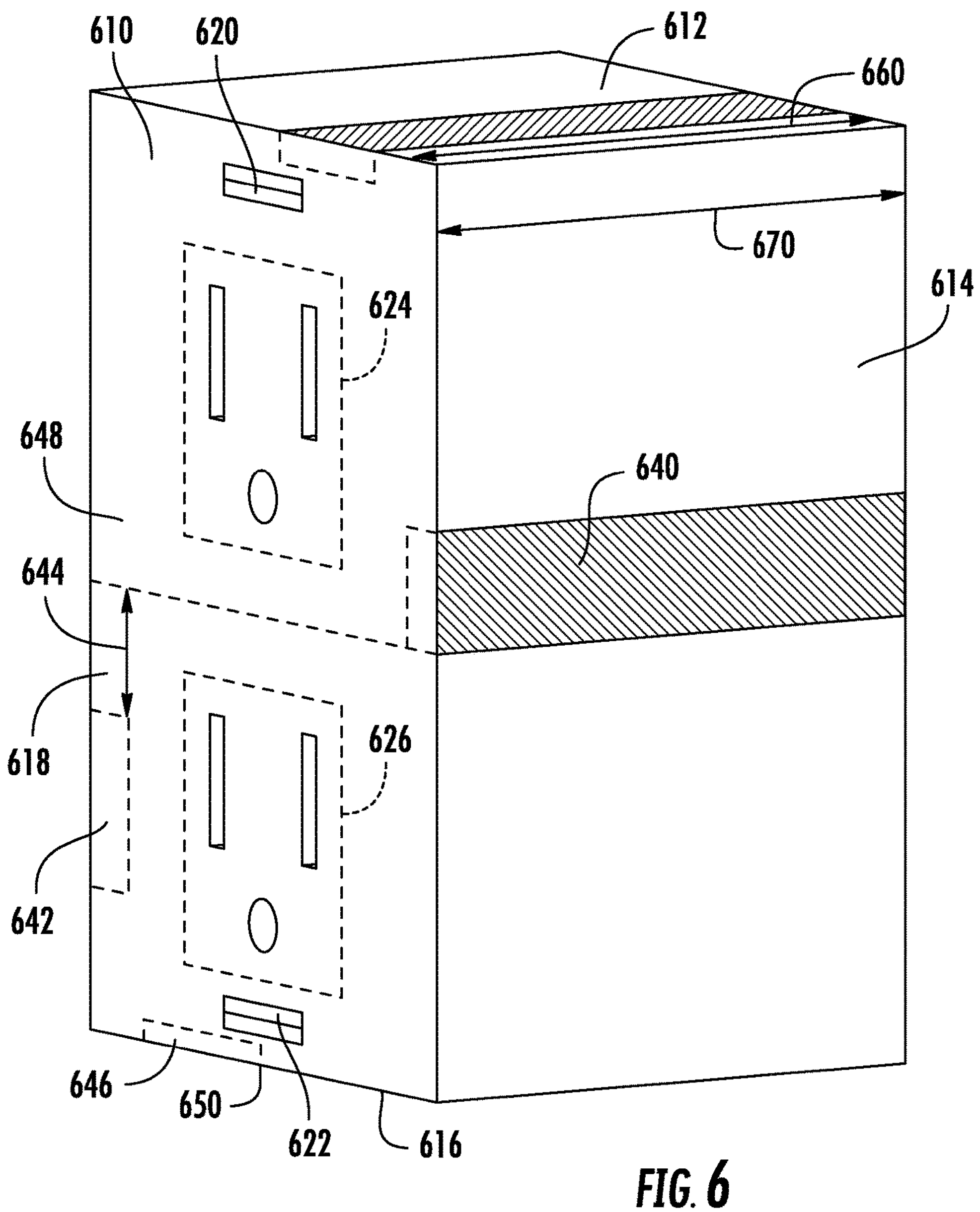
FIG. 6 depicts a side perspective view of a portable face plate supporting a universal power socket.

Face plate (510) as shown and described in FIG. 5 attaches to a junction box. Specifically, the face plate (510) is configured to mechanically and electrically communicate with the junction box to form an active outlet to supply electrical power to a power consuming device. The release mechanism(s) function to mechanically engage the junction box, and the slide(s) function to electrically engage the junction box. Referring now to FIG. 6, a side perspective view (600) of the portable face plate (610) supporting the universal power socket is presented. The items identified herein are presented in the 600 series, with the identification numbers corresponding to similar components described and identified in FIG. 5. The face plate (610) is sized and configured to be received by an electrical junction box, which is shown and described in detail in FIG. 7. In one embodiment, the face plate (610) functions as a portable socket, as will be described in detail below. In one embodiment, the configuration of the size and shape of the face plate (610) may be modified based on changes in the size and configuration of the junction box. Accordingly, the size and shape of the cover as described in detail below should not be considered limiting.

The face plate (610) further comprises two secure and release mechanisms, hereinafter referred to as release mechanisms, including a first release mechanism (620) and a second release mechanism (622). The first release mechanism (620) is proximate to the first side (612) and distal to the third side (616), and the second release mechanism (622) is proximate to the third side (616) and distal to the first side (612). The first and second release mechanisms, (620) and (622) have a corresponding securing mechanism on an opposite surface (not shown) of the face plate (610). In one embodiment, the corresponding securing mechanism mechanically attaches to a receiver in a junction box, as shown and described below in FIG. 7. When attaching the face plate (610) to the junction box, the securing mechanism (s) that correspond to the release mechanisms, (620) and (622), are received by the junction box and mechanically attach and secure the face plate (610) to the junction box. Conversely, when detaching the face plate (610) from the junction box, the securing mechanism(s) are actuated to move the release mechanisms, (620) and (622), thereby enabling the face plate (610) to be mechanically separated and removed from the junction box without any obstructions.

The face plate (610) is shown with conducting material, and more specifically, a first conducting material (640) and a second conducting material (642). In one embodiment, the first and second conducting materials, (640) and (642), respectively, comprise metallic conductors. The first and second conducting materials, (640) and (642), are not visible from the front surface (648) of the face plate (610), and as such are shown with phantom lines on the front surface (648). The first and second conducting materials, (640) and (642), are shown positioned on different walls of the face plate (610). As shown herein, the first material (640) is in communication with the second side (614) and distal to the fourth side (618), and the second material (642) is in communication with the fourth side (618) and distal to the second side (614). The first and second materials, (640) and (642), are each shown laterally offset so they are not similarly positioned on oppositely disposed walls of the face plate (610). As shown in this example, the first material (640) is laterally or longitudinally, depending on the perspective, offset from the second material (642) by a value (644). The offset prevents improper attachment of the cover (610) to a wall. For example, the position of the materials with respect to the junction box ensures that the attachment of the face plate (610) aligns its openings with wiring in the junction box to form active sockets (624) and (626). In one embodiment, face plate (610) is configured for a grounded socket, and includes a third conducting material (646) associated with the ground, which is shown herein in communication with the third side (616) and oppositely disposed from the first side (612). The ground material (646) is offset from a center position (650) of the third side (616). Accordingly, the materials (640), (642), and (646) are each positioned on different walls of the face plate (610).

The face plate (610) is a three dimensional object with each of the sides having a height, length, and depth. As shown, the first side (612) is shown with a first depth (660) and the second side (614) is shown with a second depth (670). Depths for the third and fourth sides, (616) and (618), respectively, are not shown in this view. As shown, the first material (640) is in communication with the second side (614) across the second depth (670). In one embodiment, the first material (640) communicates with the front surface (648). Similarly, the second material (642) communicates with the fourth side (618) across a depth (not shown). Accordingly, when the cover is secured to the junction box to form a socket, the conducting materials of the face plate (610) engage with the electrical wiring embedded in an associated junction box.

Figure 7:
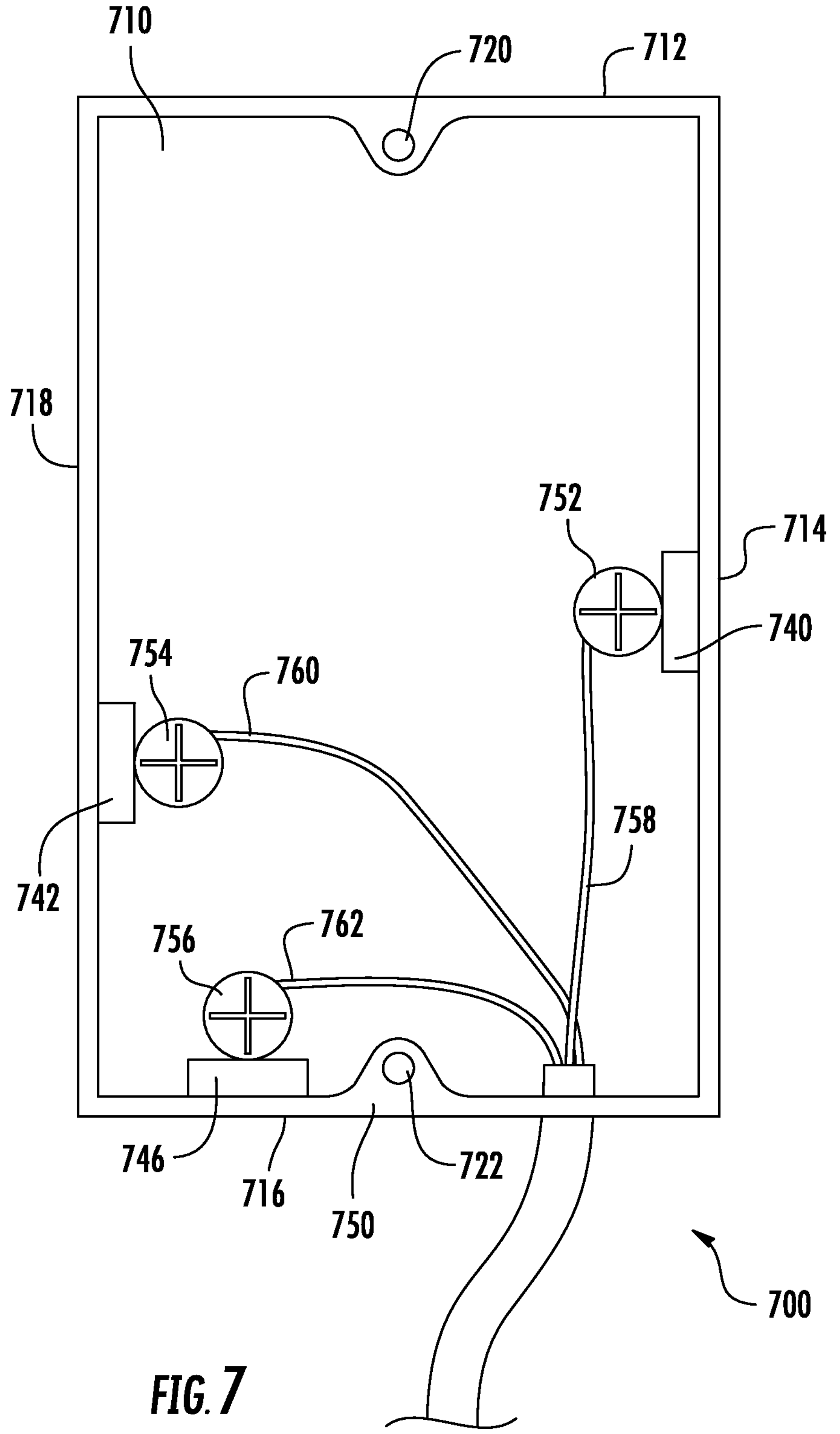
FIG. 7 depicts a front perspective view of junction box.

Referring now to FIG. 7, a front perspective view (700) of a junction box is presented. The junction box (710) is sized and configured to receive a face plate, as shown and described in FIGS. 5 and 6. Accordingly, the size and shape of the junction box (710) as described in detail below should not be considered limiting.

As shown, the junction box (710) has four sides, including a first side (712), a second side (714), a third side (716), and a fourth side (718). The first side (712) is oppositely disposed from the third side (716), and in one embodiment sides (712) and (716) are arranged parallel or relatively parallel. The second side (714) is oppositely disposed from the fourth side (718), and in one embodiment, sides (714) and (718) are arranged parallel or relatively parallel. Both first and third sides, (712) and (716), are adjacent to the second side (714) and the fourth side (718), respectively. In an exemplary embodiment, the four sides, (712), (714), (716), and (718), form a rectangular structure, as understood in conventional junction boxes. The shape of the junction box is presented for exemplary purposes and is not meant to be limiting.

The box (710) further comprises two receivers, including a first receiver (720) and a second receiver (722). The first receiver (720) is proximate to the first side (712) and distal to the third side (716). The second receiver (722) is proximate to the third side (716) and distal to the first side (712). The first and second receivers, (720) and (722), respectively, are configured to receive corresponding securing mechanisms on a face plate. See FIGS. 5 and 6. In one embodiment, the corresponding securing mechanisms mechanically attach to the receivers, (720) and (722). When attaching the face plate (510) and (610) to the junction box (710), the securing mechanism(s) that correspond to the receivers (720) and (722) are received by the junction box and mechanically attach and secure the face plate to the junction box (710). The receivers, (720) and (722), are shown and described as mechanical interfaces between the face plate and the junction box (710). In one embodiment, the receivers (720) and (722) support an ability to employ a screw to more permanently secure the face plate to the junction box (710), e.g. long-term attachment. In one embodiment, the receivers, (720) and (722), are configured with threaded receiving openings to receive threaded members, such as screws. In one embodiment, the receivers, (720) and (722), may take on different shapes and forms, including but not limited to a magnetic interface, an electrical interface, etc., without hindering the ability to attach the face plate to the junction box (710). Accordingly, the first and second receivers, (720) and (722), respectively, support permanent attachment of the face plate to the junction box (710) with respect to the socket to form a universal electrical outlet.

The junction box (710) is shown with conducting material, and more specifically, a first material (740) and a second material (742). Both of the first and second materials, (740) and (742), respectively, comprise conducting material. In one embodiment, the first and second materials, (740) and (742), comprise metallic conductors. The first and second materials, (740) and (742), are shown positioned on different walls of the junction box (710). More specifically, the first material (740) is in communication with the second side (714) and distal to the fourth side (718), and the second material (742) is in communication with the fourth side (718) and distal to the second side (714). The first and second materials, (740) and (742), are each shown laterally offset so they are not similarly positioned on oppositely disposed walls of the junction box (710). The position of the materials of the junction box (710) with respect to the face plate ensures that the attachment of the face plate electrically and mechanically engages the junction box (710). In the case of a face plate configured for a grounded socket, the junction box (710) further comprises a ground material (746), which is shown herein in communication with the third side (716) and oppositely disposed from the first side (712). The ground material (746) is offset from the center point (750) of the third side (716). Accordingly, the materials (740), (742), and/or (746) are each positioned on different walls of the face plate (710).

The junction box (710) further comprises a junction of electrical wires, as is understood in conventional junction boxes. The electrical wires communicate with the power slides via connection screws. Specifically, the junction box (710) comprises three connection screws, a first connection (752), and a second connection (754), and a third connection (756). The first, second, and third connections, (752), (754), and (756), are in communication with the first material (740), second material (742), and third material (746), respectively. Each connection provides a member for receiving wiring. Specifically, the first connection (752) receives a first wire (758), the second connection (754) receives a second wire (760), and the third connection (756) receives a third wire (762). In one embodiment, the communication of face plate materials with the junction box materials (740), (742), and (746), provides safety features, as all power slides must be engaged to allow power to flow into the junction box. More specifically, the engagement provides an insulated electrical connection between the junction box (710) and a universal face plate, as shown and described in FIGS. 5 and 6, and activates the embedded logic, as shown and described in FIG. 1, to form a socket. The junction box (710) may receive a universal face plate that employs the functionality of the described logic, or it may receive a conventional face plate. Accordingly, the junction box comprises features to accept the universal face plate, which may activate the functionality of the logic upon receipt of a uniquely shaped plug contact.

Figure 8:
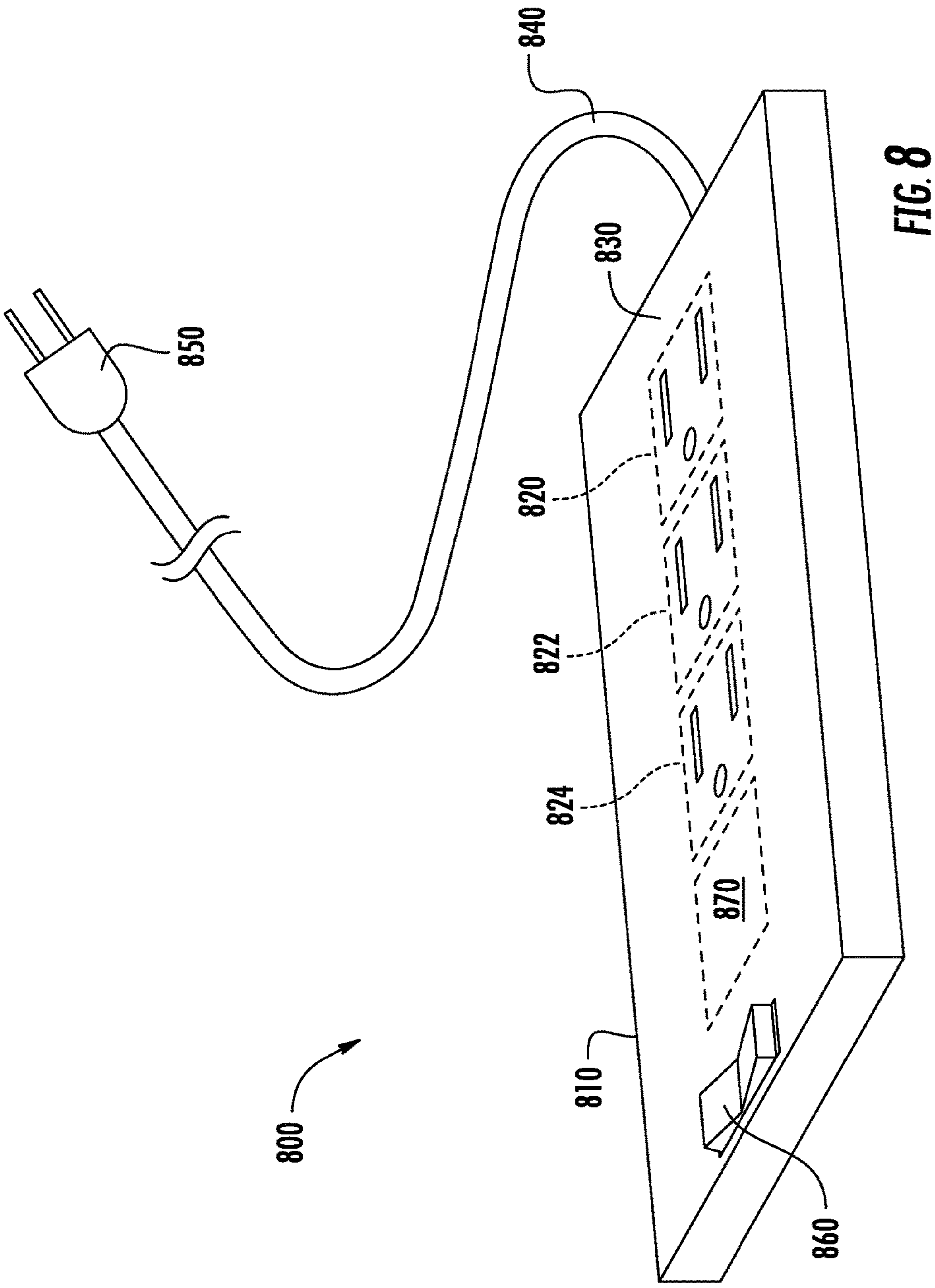
FIG. 8 depicts a perspective view of an extension cord.

Referring now to FIG. 8, a perspective view (800) of an extension cord is presented. The extension cord is shown herein as a power strip (810), which is an electrical device that has a series of outlets attached to a cord with a plug on one end for receipt by an electrical outlet. The power strip (810) is shown with a body (830) in communication with a cord (840) and an associated plug (850). The plug (850) comprises a standard prong for communication with a standard wall outlet. The extension cord (810) further comprises a local power switch (860) to regulate power to the extension cord once the plug (850) is engaged with a power source.

The embodiments shown and described in FIGS. 1-4 relate to the extension cord (810) having sockets to receive a contact of an electrical plug, and more specifically, an arrangement of sensors within the sockets, with the sensors in communication with logic to transform the voltage level required for delivery to a power consuming device. The extension cord (810) shown herein is configured with a plurality of sets of openings, (820), (822), and (824). When the plug (850) is received by and secured to an outlet, an active socket is formed so that receipt of a second electrical plug contact in one of the sets of openings, (820), (822), and (824), will engage sensors in the openings to dynamically assess and deliver electrical energy to a power consuming device. Both a grounded plug and an ungrounded plug are supported. Logic (870) is embedded within the extension cord (810). The local power switch (860) activates the logic (870). Each engaged sensor will communicate with the logic to deliver electrical energy to the plug contact. The electrical energy is delivered at the level that correlates with the detected contact shape as described in FIGS. 1-4. Accordingly, the extension cord (810) is configured to deliver electrical energy to power consuming devices by delivering voltage levels correlated to the physical profiles of the contacts.

As further shown, a switch (860) is provided embedded with the extension cord (810). The switch (860) is provided in communication with the logic (870) and functions to activate or deactivate the logic (870). More specifically, when the switch (860) is placed in an ON position, the logic (870) is activated so that a received electrical prong may be detected and delivery of power may be dynamically controlled. Similarly, when the switch (860) is placed in an OFF position, the logic (870) is de-activated so that the power strip (810) functions as a conventional power strip to statically deliver power to a received plug contact. Accordingly, the logic (870) is shown herein embedded within the power strip (810) to support the functionality shown and described in FIGS. 1-4.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed.

Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the implementation of sensors and logic within socket openings to detect power requirements and deliver power via a socket or extension cord is herein above described.

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

What is claimed is:

1. A power outlet comprising:

a socket having an opening to receive a plug to deliver electrical energy to an associated electronic device, the plug having at least one contact;

the contact having a physical profile correlating with a voltage requirement for the device;

at least one sensor in communication with the socket, the sensor to detect the physical profile of the contact; and logic in communication with the sensor, the logic configured for a plurality of voltage levels, each level corresponding to one voltage requirement, and each level assigned to a defined physical profile of the contact, the logic to convert the detected physical profile of the contact to the voltage requirement for the device, and to deliver power to the device at a level correlated with the requirement.

2. The power outlet of claim 1, further comprising the opening having two or more sensors.

3. The power outlet of claim 1, further comprising the socket having at least two openings, each opening to receive one contact, and each opening having at least one sensor.

4. The power outlet of claim 1, wherein the physical profile of the contact is selected from a group of at least two different physical profiles.

5. An apparatus comprising:

a box containing a junction of electric wires; and the box configured to receive a cover, wherein communication between the box and the cover forms an electric socket, the cover comprising:

a first metal conductor positioned in communication with a first wall of the cover;

a second metal conductor positioned in communication with a second wall of the cover;

the first and second conductors adapted to engage with the box, including the first conductor in communication with a first corresponding contact of the box and the second conductor in communication with a second corresponding contact of the box; and an engagement of the first and second conductors with the box to activate logic, wherein the logic dynamically selects a voltage level and delivers corresponding power at the selected level to a power receiving device.

6. The apparatus of claim 5, further comprising the cover having an opening configured to receive a plug as an interface between a power supply in communication with the box and the power receiving device, and a sensor in communication with the opening, the sensor to detect a characteristic of the plug and to communicate the detected characteristic of the plug to the logic.

7. The apparatus of claim 6, further comprising the logic to receive the detected characteristic of the plug and to convert the detected characteristic of the plug to a required voltage level for the object.

8. The apparatus of claim 7, further comprising the logic to deliver power at the required level to the power receiving device.

9. The apparatus of claim 7, wherein the detected characteristic is a physical profile of the plug that correlates with one of the voltage levels available for dynamic selection.

10. The apparatus of claim 5, wherein the first and second conductors are positioned on non-adjacent walls.

11. The apparatus of claim 6, wherein the first and second conductors are laterally offset.

12. An apparatus comprising:

a length of electric cord to permit use of an electrical appliance;

the cord having a first end with at least one contact adapted to communicate with an electrical outlet;

a series of at least two secondary outlets in communication with the cord, including a first outlet and a second outlet, the first and second outlets positioned between the first end and an oppositely disposed second end;

one or more sensors in communication with at least one secondary outlet within the series of secondary outlets, at least one sensor of the one or more sensors to detect a physical profile of a contact in communication with a power consuming object; and logic embedded within the series of secondary outlets in communication with the at least one sensor, the logic to dynamically select a voltage level for the power consuming object utilizing the detected physical profile of the contact and deliver corresponding power at the selected level to the object.

13. The apparatus of claim 12, further comprising the logic to separately deliver power at different voltage levels to separate objects, wherein each object is in communication with one of the at least two secondary outlets within the series of secondary outlets.

14. The apparatus of claim 13, further comprising a first object in communication with the first outlet and a second object in communication with a second outlet, and the logic to dynamically select a first voltage level for the first object and a second voltage level for the second object.

15. The apparatus of claim 12, further comprising each of the secondary outlets having an opening configured to receive a plug as an interface between a power supply in communication with the logic and the object, and the at least one sensor in communication with the opening, the sensor to communicate the detected characteristic to the logic.

16. The apparatus of claim 15, further comprising the logic to convert the detected physical profile of the contact to the required voltage level for the object.

17. The apparatus of claim 16, wherein the physical profile of the contact correlates with one of the voltage levels available for dynamic selection.

* * * * *